Figure 1:
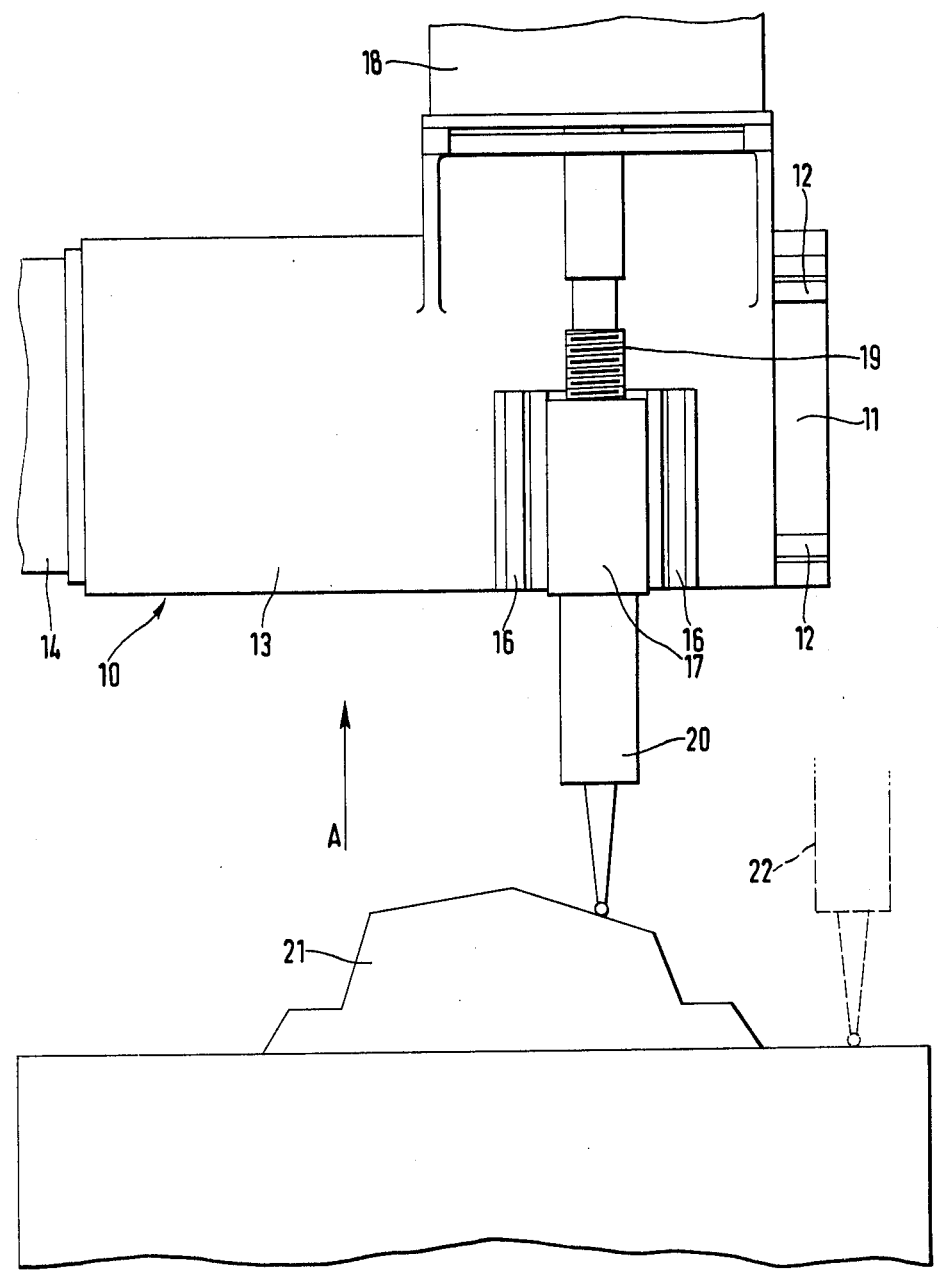

United States Patent [19]

Amsbury et al.

[11] 4,164,694
[45] Aug. 14, 1979

[54] MEANS FOR INDICATING THE PROFILE OF A WORKPIECE

[75] Inventors: Clifford R. Amsbury, King's Newton; Eric Warren, Etwall, both of England

[73] Assignee: Rolls-Royce Limited, London, England

[21] Appl. No.: 833,655

[22] Filed: Sep. 15, 1977

[30] Foreign Application Priority Data

Sep. 25, 1976 [GB] United Kingdom ............... 39925/76

[51] Int. Cl.² .......................................... G05B 19/36
[52] U.S. Cl. .................................... 318/578; 318/685
[58] Field of Search ................. 318/568, 578, 561, 39, 318/685

[56] References Cited

U.S. PATENT DOCUMENTS

| | | | |
|---|---|---|---|
| 2,640,176 | 5/1953 | Calosi | 318/578 |
| 3,624,371 | 11/1971 | Neal | 318/568 X |
| 3,629,558 | 12/1971 | Coggin | 318/568 X |
| 3,727,119 | 4/1973 | Stanley et al. | 318/578 X |
| 3,878,761 | 4/1975 | Makowski | 318/578 X |

Primary Examiner—B. Dobeck
Attorney, Agent, or Firm—Cushman, Darby & Cushman

[57] ABSTRACT

Apparatus for indicating the profile of a workpiece comprises a probe driven in mutually perpendicular axes to follow the workpiece profile, and means provided to display the movements of the probe as an indication of the workpiece profile. A control system associated with the probe and its driving means ensures that the probe is driven at an optimum rate.

5 Claims, 3 Drawing Figures

MEANS FOR INDICATING THE PROFILE OF A WORKPIECE

This invention relates to means for indicating the profile of a workpiece.

During or after the manufacture of a workpiece, it is frequently desirable to inspect its profile in order to determine whether that profile deviates from a desired profile and if so, by how much. One method of achieving this end is to follow the profile of the workpiece with a suitable probe which is associated with means adapted to translate the movements of the probe into a visual representation of the profile. The visual representation obtained can then be compared with a suitable master profile. Whilst this method is satisfactory so far as the following of profiles with shallow inclines is concerned, it is less satisfactory when the probe is driven and the inclines steep. It is frequently found when following such profiles that the response speed of the probe on the steep inclines is too great for the visual profile representation means to give an accurate result. However if the following speed of the probe is reduced, the time taken to perform a complete profile plot is usually prohibitively long.

It is an object of the present invention to provide means for indicating the profile of a workpiece whereby the probe follows the profile to be inspected at an optimum rate.

According to the present invention, means suitable for indicating the profile of a workpiece comprises a probe adapted to be driven along first and second mutually perpendicular axes to follow the profile of said workpiece by respective first and second drive means, control means associated with said probe and said first and second drive means, means for supporting said workpiece to be followed by said probe and means adapted to display the outputs of said first and second drive means as an indication of the profile of said workpiece, said control means being adapted such that said probe is normally driven by said first drive means along said first axis at a substantially constant rate and that said second drive means drives said probe along said second axis to alternately make and break contact with said workpiece, said control means being arranged such that if the distance traversed by the probe along said second axis after a making but before a breaking of contact, or after a breaking but before a succeeding making of contact of said probe with said workpiece exceeds a predetermined limit, said first drive means is slowed down or halted until the succeeding breaking or making of contact respectively occurs whereupon said first drive means is restored to said constant drive rate.

Thus it is possible to follow the profile of a workpiece comparatively rapidly over portions having shallow inclines but desirably slowly over portions having steep inclines.

The drive means preferably comprise stepping motors.

The probe may be electrically polarised so that if said workpiece is electrically conductive, suitable electrical signals may be derived upon the making or breaking of contact of said probe with said workpiece for said control means to determine the direction of travel of said probe when driven by said second drive means.

Alternatively said probe may incorporate an electrical switch operable when contact is made or broken with said workpiece to provide said suitable electrical signals for said control means.

The means adapted to display the outputs of said drive means as an indication of the profile of said workpiece may comprise, in combination, counting means and a digital-to-analogue converter associated with each of said drive means, and a coordinate plotter adapted to indicate the outputs of said digital-to-analogue converters.

Figure 2:
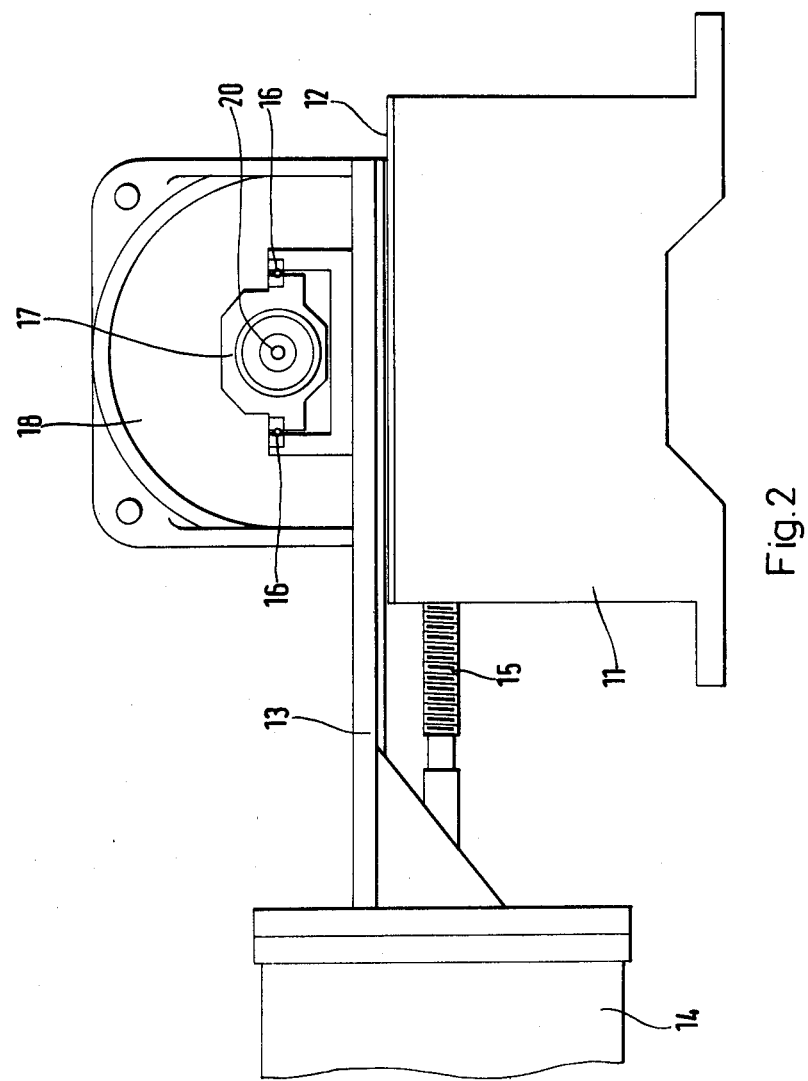
Figure 3:
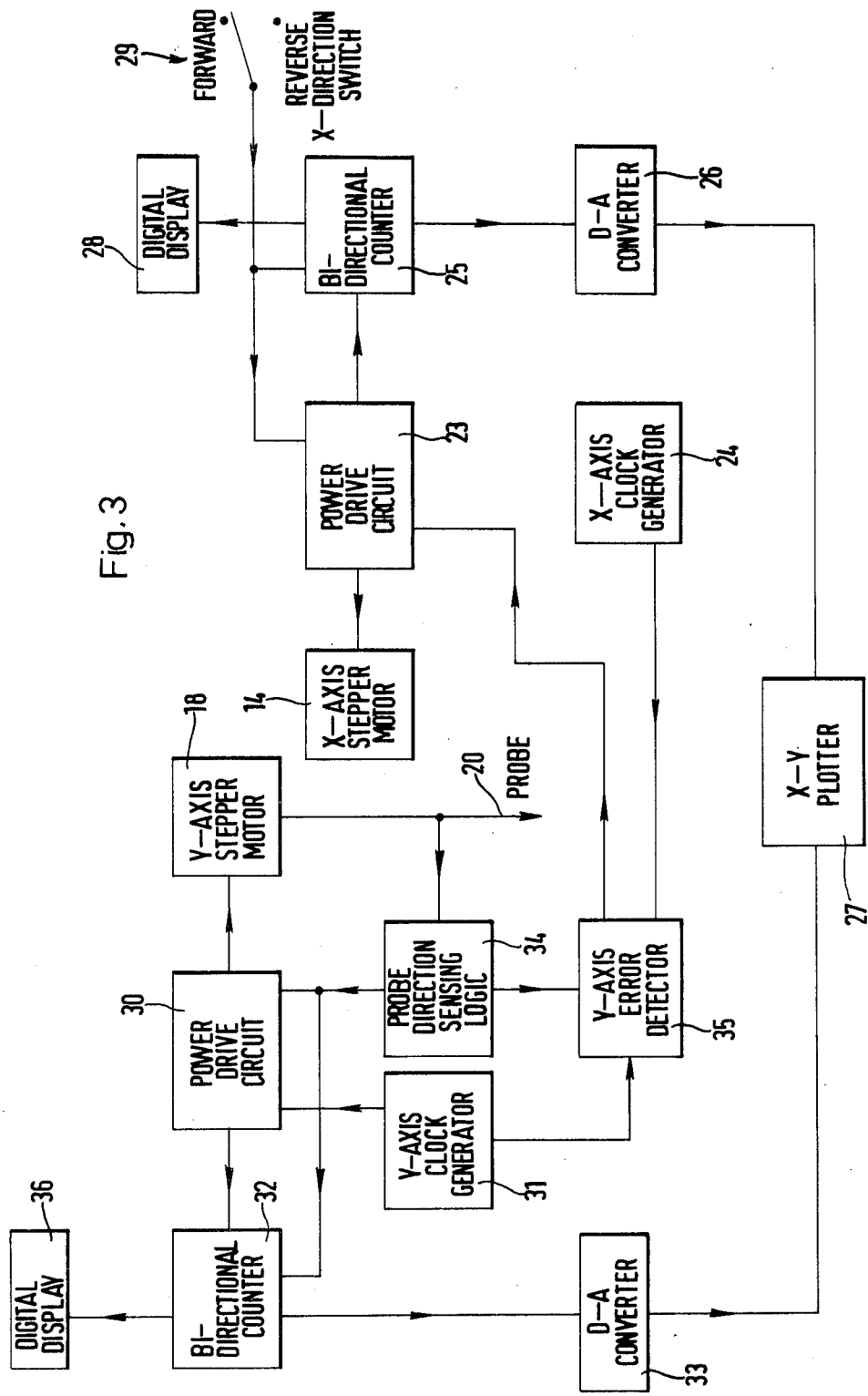

The invention will now be described, by way of example, with reference to the accompanying drawings in which:

FIG. 1 is a side view of profile plotter in accordance with the present invention and a workpiece having its profile followed by said profile plotter, FIG. 2 is a view on arrow A of the profile plotter shown in FIG. 1, and FIG. 3 is a block diagram of control means suitable for use with the profile plotter shown in FIGS. 1 and 2.

With reference to FIG. 1, a profile plotter generally indicated at 10 comprises a body 11 (see also FIG. 2) which is adapted to be attached to a fixed support (not shown). The body 11 is provided with two roller tracks 12 upon which a first slide 13 is located. On one end of the slide 13 there is provided a first stepping motor 14 which is adapted to drive the first slide 13 relative to the body 11 via a lead screw 15 which locates in an anti-backlash nut provided in the body 11.

The first slide 13 is in turn provided with two roller tracks 16 which are perpendicular to the roller tracks 12 and upon which a second slide 17 is located. A second stepping motor 18 provided on the first slide 13 is adapted to drive the second slide 17 relative to the first slide 13 via a lead screw 19 which locates in an anti-backlash nut provided in the second slide 17. A probe 20 is fixedly mounted on the second slide 17.

Thus the probe 20 may be translated along two mutually perpendicular axes by means of the actuation of the stepping motors 14 and 18.

The lead screw 19 has 40 teeth per inch and its associated stepping motor 18, 500 steps per revolution thereby giving the second slide 17 50μ inches of travel per step of the motor 18. Similarly the lead screw 15 has 50 teeth per inch and its associated stepping motor 14, 200 steps per revolution thereby giving the first slide 13 100μ inches of travel per step of the motor 14. It will be appreciated however that these figures may be suitably altered in accordance with different embodiments of the present invention.

When the profile of an electrically conductive workpiece 21 is required to be plotted, the probe 20, which is insulated from the second slide 17, is electrically polarised with a suitably small voltage. It is then driven to a suitable starting position 22 by means of the motors 14 and 18. The motor 14 is then driven at a constant rate so as to translate the probe across the workpiece 21. Simultaneously the motor 18 is driven so as to urge the probe 20 into contact with the workpiece 21. As soon as the probe 20 is depolarised, signifying contact with the workpiece 21, the motor 18 is reversed so as to break contact. As soon as contact is broken the motor 18 is reversed again and is driven back into contact with the workpiece 21. Thus it will be seen that the probe 20 alternately makes and breaks contact with the workpiece 21 as it is translated by the motor 14.

As soon as the probe 20 encounters a downward incline upon translation across the workpiece 21 which is of such an angle that more than 8 steps of the motor 18 are registered in the downward direction after contact with the workpiece 21 has been broken, i.e. with no reversals, the motor 14 is halted. The motor 14 does not restart until the probe 20 re-establishes and then breaks contact with the workpiece 21. It will be appreciated however that in certain circumstances, it may be acceptable for the motor 14 to merely slow down instead of stopping if more than 8 steps of the motor 18 are registered.

If the probe 20 encounters an upward incline which is of such an angle that the probe 20 does not break contact with the workpiece 21, but continues to be driven by the motor 18 more than 8 steps in the upward direction, the motor 14 is again halted. The motor 14 does not restart until the probe 20 breaks contact with the workpiece 21.

Thus it will be seen that a high profile plotting rate may be achieved since the probe 20 is effectively slowed down only upon meeting an incline and that the severity of the incline governs the effective speed at which it is traversed by the probe 20. Although the limiting figure of 8 steps of the motor 18 has been chosen for this particular embodiment of the present invention, it will be understood that other limiting figures could be more effective in the case of other embodiments.

The outputs of the stepping motors 14 and 18 are linked to a coordinate plotter via bi-directional counters and digital to analogue converters so as to provide a representation of the profile of the workpiece 21 being followed.

The actual circuitry controlling the stepping motors 14 and 18 can be seen diagrammatically in FIG. 3. In the interests of brevity, the axes along which the first and second slides 13 and 17 translate are referred to as X and Y respectively.

The X-axis stepping motor 14 is driven by a power drive circuit 23 from a clock generator 24. A bi-directional counter 25 records the total number of forward and reverse pulses of the motor 14. The output of the bi-directional counter 25 is fed to a digital display unit 28 and also into a digital-to-analogue converter 26 which subsequently gives a voltage output to drive the X-axis of an X-Y coordinate plotter 27. A switch 29 is linked to the power drive circuit 23 and bi-directional counter 25 to determine the direction in which the probe 20 is driven by the X-axis stepping motor 14.

The Y-axis stepping motor 18 is driven by a further power drive circuit 30 from a second clock generator 31. As in the case of the X-axis circuitry, a bi-directional counter 32 records the total number of forward and reverse pulses of the motor 18 and feeds its output to a digital display unit 36 and also a digital-to-analogue converter 33. The voltage output of the digital to analogue converter 33 is then used to drive the Y-axis of the X-Y coordinate plotter 27.

The direction in which the probe 20 is driven by the Y-axis stepping motor 18 is controlled by a direction sensing logic circuit 34; open circuit causing the probe 20 to descend and short circuit to retract.

The outputs of the probe direction sensing logic circuit 34 and the Y-axis clock generator are fed into an error detector 35 which consists of a further bi-directional counter. Normally, when the probe 20 is being driven within its speed capability by the Y-axis stepping motor 18, the Y-axis error detector 35 only totals two or three counts in a given direction before that direction is reversed and the Y-axis error detector 35 zeroed by the probe direction sensing logic 34. However when the probe 20 ascends or descends a slope of steep incline, the number of counts in a given direction between makes or breaks of contact of the probe 20 with the workpiece 21 increases. When that number reaches 8, an error signal is fed by the Y-axis error detector 35 into the power drive circuit 23 whereupon power to the X-axis stepper motor 14 is stopped. As soon as the probe 20 breaks contact with the workpiece 21 again, the probe direction sensing logic circuit 34 restarts the Y-axis stepper motor and zeros the Y-axis error detector 35. Thereupon the error signal from the Y-axis error detector 35 to the X-axis power drive circuit is withdrawn and the X-axis stepper motor 14 re-commences driving the probe 20.

Although the present invention has been described with reference to a probe 20 which is polarised with a small voltage in order to provide a signal which signifies contact with the workpiece 21, it will be understood that other methods of workpiece contact indication could be utilised. Thus the probe could be of the type which incorporates an electrical switch which is opened by the deflection of the probe upon its contact with the workpiece.

It will also be understood that the present invention may be associated with further suitable circuitry which compensates for the dimensions of the probe 20 so that the coordinate plotter 27 gives an accurate representation of the profile being plotted.

We claim:

1. Means suitable for indicating the profile of a workpiece comprising a probe, first and second drive means respectively adapted to drive said probe along first and second mutually perpendicular axes to follow the profile of said workpiece, control means associated with said probe and said first and second drive means, means for supporting said workpiece to be followed by said probe and means adapted to display the outputs of said first and second drive means as an indication of the profile of said workpiece, said control means being adapted such that said probe is normally driven by said first drive means along said first axis at a substantially constant rate and that said second drive means drives said probe along said second axis to alternately make and break contact with said workpiece, said control means being arranged such that if the distance traversed by the probe along said second axis after a making but before a breaking of contact, or after a breaking but before a succeeding making of contact of said probe with said workpiece exceeds a predetermined limit, said first drive means is slowed down or halted until the succeeding making or breaking of contact respectively occurs whereupon said first drive means is restored to said constant drive rate.

2. Means suitable for indicating the profile of a workpiece as claimed in claim 1 wherein said drive means comprises stepping motors.

3. Means suitable for indicating the profile of a workpiece as claimed in claim 1 wherein said probe is electrically polarised so that if said workpiece is electrically conductive, suitable electrical signals may be derived upon the making or breaking of contact of said probe with said workpiece for said control means to determine the direction of travel of said probe when driven by said second drive means.

4. Means suitable for indicating the profile of a workpiece as claimed in claim 1 wherein said probe incorporates an electrical switch operable when contact is made or broken with said workpiece to provide suitable electrical signals for said control means to determine the direction of travel of said probe when driven by said second drive means.

5. Means suitable for indicating the profile of a workpiece as claimed in claim 1 wherein said means adapted to display the outputs of said drive means as an indication of the profile of said workpiece comprises, in combination, counting means and a digital to analogue converter associated with each of said drive means, and a coordinate plotter adapted to indicate the outputs of said digital to analogue converters.

* * * * *